US012174328B2

(12) United States Patent
Alali et al.

(10) Patent No.: US 12,174,328 B2
(45) Date of Patent: Dec. 24, 2024

(54) METHODS AND SYSTEMS FOR REAL-TIME MODIFICATIONS TO SEISMIC ACQUISITION OPERATIONS

(71) Applicant: SAUDI ARABIAN OIL COMPANY, Dhahran (SA)

(72) Inventors: Abdulmohsen Alali, Dhahran (SA); Constantinos Tsingas, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 422 days.

(21) Appl. No.: 17/647,223

(22) Filed: Jan. 6, 2022

(65) Prior Publication Data

US 2023/0213672 A1 Jul. 6, 2023

(51) Int. Cl.
*G01V 1/30* (2006.01)
*G01V 1/28* (2006.01)

(52) U.S. Cl.
CPC .............. *G01V 1/306* (2013.01); *G01V 1/282* (2013.01); *G01V 1/303* (2013.01); *G01V 2210/6222* (2013.01)

(58) Field of Classification Search
CPC ........ G01V 1/306; G01V 1/282; G01V 1/303; G01V 2210/6222; G01V 1/003; G01V 2210/612; G01V 1/308; G01V 1/42
See application file for complete search history.

(56) References Cited

U.S. PATENT DOCUMENTS 9,594,176 B1 3/2017 Popovici et al.
10,371,839 B2 8/2019 Tsingas
(Continued)

FOREIGN PATENT DOCUMENTS

CA 3134048 A1 * 9/2020 ............. G01V 1/282
CN 117546051 A * 2/2004 ............. G01V 1/282
(Continued)

OTHER PUBLICATIONS

Berkhout, A.J., "Review Paper: An outlook on the future of seismic imaging, Part III: Joint Migration Inversion", Geophysical Prospecting, European Association of Geoscientists & Engineers, vol. 62, 2014, pp. 950-971 (22 pages).
(Continued)

*Primary Examiner* — Daniel Pihulic
(74) *Attorney, Agent, or Firm* — Osha Bergman Watanabe & Burton LLP

(57) ABSTRACT

A method and system for forming a seismic image of a subterranean region are disclosed. The method includes determining an initial plan for a seismic survey with a value for each member of a set of acquisition parameters and acquiring a first seismic dataset from a first portion of the seismic survey based on the initial plan. The method further includes transmitting the first seismic dataset to a seismic processor, determining a first seismic image from the first seismic dataset by performing expedited seismic processing and determining a first updated plan for the seismic survey based on the first seismic image and acquiring a second seismic dataset from a second portion of the seismic survey based on the first updated plan. The method still further includes transmitting the second seismic dataset to the seismic processor and determining the seismic based on the first seismic dataset and the second seismic dataset.

17 Claims, 8 Drawing Sheets

(56) References Cited

U.S. PATENT DOCUMENTS

| | | | |
|---|---|---|---|
| 11,169,287 B2* | 11/2021 | Al-Saleh | G01V 1/303 |
| 11,340,368 B2* | 5/2022 | Sun | G01V 1/303 |
| 11,448,788 B2* | 9/2022 | Goteti | G01V 1/301 |
| 11,668,848 B2* | 6/2023 | Gashawbeza | G01V 1/282 702/14 |
| 11,867,857 B2* | 1/2024 | He | G01V 1/303 |
| 2011/0096627 A1 | 4/2011 | Hill | |
| 2013/0003500 A1* | 1/2013 | Neelamani | G01V 1/28 367/73 |
| 2014/0160882 A1 | 6/2014 | Vu et al. | |
| 2015/0346368 A1 | 12/2015 | Dellinger et al. | |
| 2016/0109589 A1 | 4/2016 | Liu | |
| 2016/0187516 A1 | 6/2016 | Brenders et al. | |
| 2016/0341836 A1 | 11/2016 | Poole | |
| 2019/0094401 A1 | 3/2019 | Van Groenestijn | |
| 2019/0331815 A1 | 10/2019 | Zhang | |
| 2020/0292724 A1 | 9/2020 | Boiero et al. | |
| 2020/0301035 A1* | 9/2020 | Sun | G01V 1/303 |
| 2021/0018638 A1* | 1/2021 | Goteti | G01V 1/282 |
| 2021/0080598 A1* | 3/2021 | Adler | G01V 1/345 |
| 2021/0223424 A1* | 7/2021 | Valensi | G01V 1/303 |
| 2021/0302606 A1* | 9/2021 | Al-Saleh | G01V 1/34 |
| 2022/0187485 A1* | 6/2022 | Kim | G01V 1/305 |
| 2022/0236435 A1* | 7/2022 | Ni | G01V 1/282 |
| 2022/0413172 A1* | 12/2022 | Gashawbeza | G01V 1/303 |
| 2023/0029642 A1* | 2/2023 | He | G01V 1/306 |
| 2023/0213672 A1* | 7/2023 | Alali | G01V 1/306 367/73 |
| 2024/0118442 A1* | 4/2024 | Zhang | G01V 1/303 |
| 2024/0125961 A1* | 4/2024 | Alali | G01V 1/301 |

FOREIGN PATENT DOCUMENTS

| | | | | | |
|---|---|---|---|---|---|
| CN | 110869813 A | * | 3/2020 | | G01V 1/003 |
| CN | 117480410 A | * | 1/2024 | | E21B 49/00 |
| WO | WO-2018224607 A1 | * | 12/2018 | | G01V 1/003 |
| WO | WO-2020191155 A1 | * | 9/2020 | | G01V 1/282 |
| WO | WO-2021016064 A1 | * | 1/2021 | | G01V 1/282 |
| WO | WO-2021194524 A1 | * | 9/2021 | | G01V 1/282 |

OTHER PUBLICATIONS

Berkhout, A. J., "Blended acquisition with dispersed source arrays", Geophysics, Society of Exploration Geophysicists, vol. 77, No. 4, Jul.-Aug. 2012, pp. A19-A23 (5 pages).

Bouska, Jack, "Distance separated simultaneous sweeping: efficient 3D Vibroseis acquisition in Oman", SEG Houston 2009 International Exposition and Annual Meeting, 2009, pp. 1-5 (5 pages).

Tanushev, Nick, et al., "Fast, high-resolution beam tomography and velocity-model building", The Leading Edge, Feb. 2017, pp. 140-145 (6 page).

Tsingas, Constantine, et al., "3D distributed and dispersed source array acquisition and data processing", The Leading Edge, Jun. 2020, pp. 392-400 (9 pages).

Tsingas, Constantine, et al., "Broadband acquisition, deblending, and imaging employing dispersed source arrays", The Leading Edge, Apr. 2016, pp. 354-360 (7 pages).

Verschurr, DJ and A.J. Berkhout., "Target-oriented, Least-squares Imaging of Blended Data", SEG Houston 2009 International Exposition and Annual Meeting, Oct. 2009, pp. 2889-2893 (5 pages).

\* cited by examiner

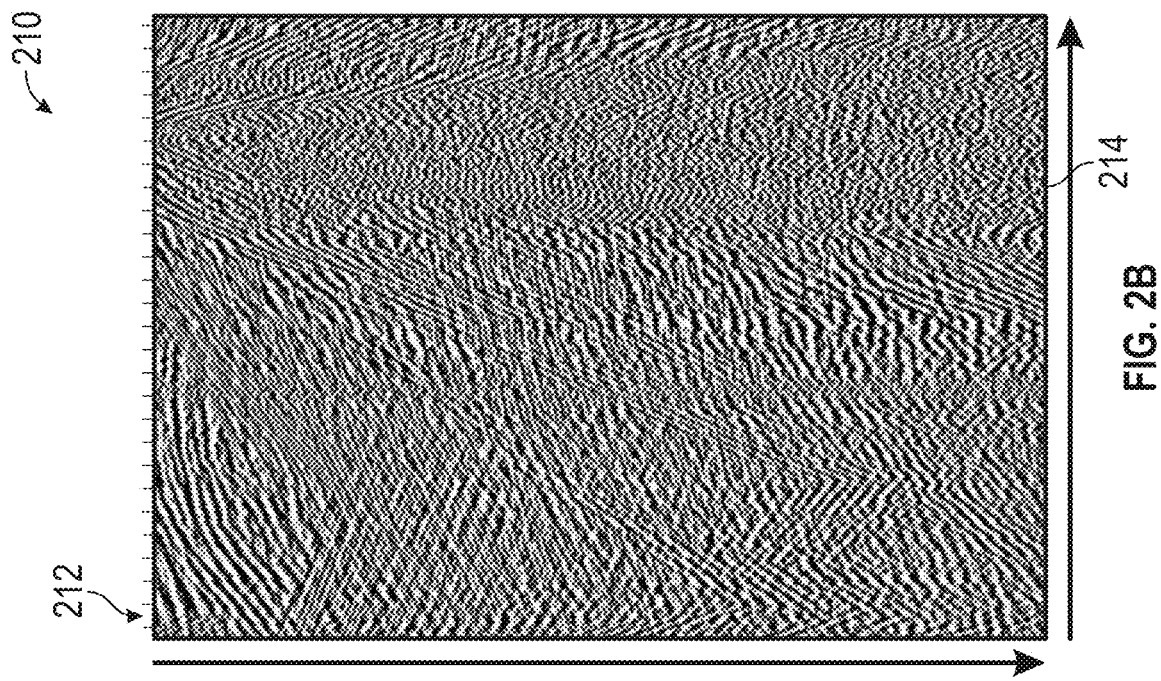
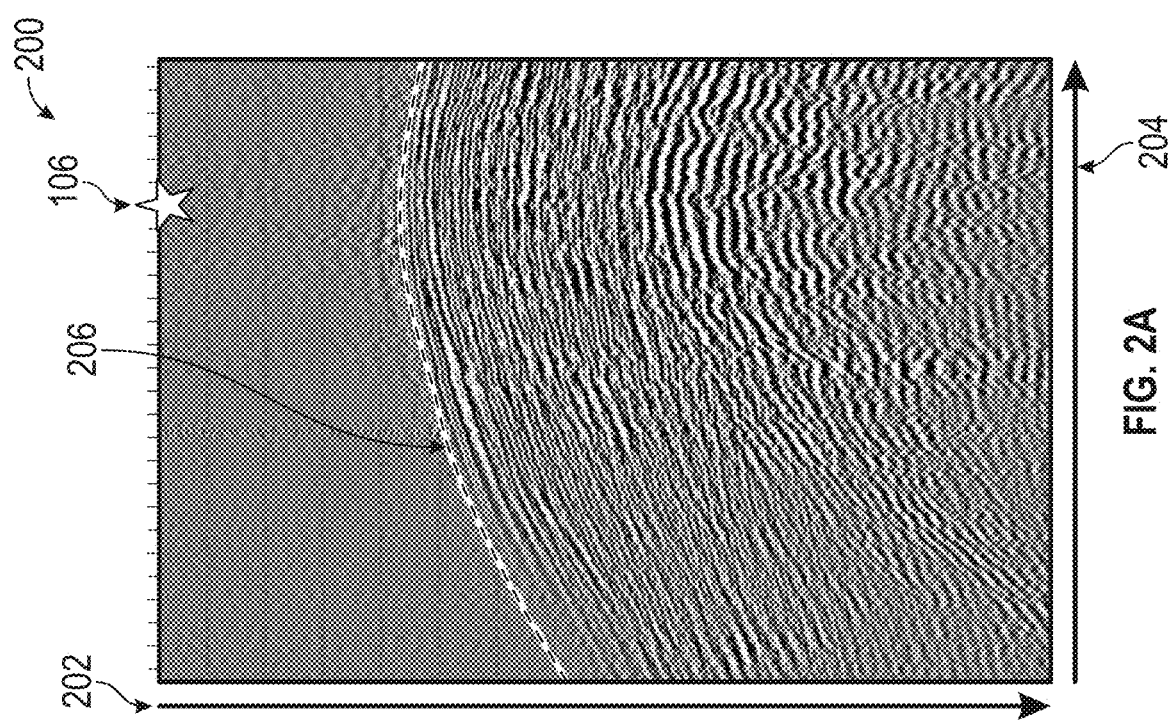
FIG. 2B
FIG. 2A

METHODS AND SYSTEMS FOR REAL-TIME MODIFICATIONS TO SEISMIC ACQUISITION OPERATIONS

BACKGROUND

Seismic surveys are frequently conducted by participants in the oil and gas industry. Seismic surveys are conducted over subterranean regions of interest during the search for, and characterization of, hydrocarbon reservoir and surface hazard detection and geotechnical surveys. In seismic surveys, a seismic source generates seismic waves which propagate through the subterranean region of interest and are detected by seismic sensors or receivers. Typically, both seismic sources and seismic receivers are located on the surface of the earth. The seismic data are recorded as time-series with delays from the initiation of the source. The collection of time series of samples recorded at many seismic receiver locations generated by a seismic source at many source locations constitutes a seismic data set.

The acquisition of a seismic survey is typically conducted according to a predetermined pre-survey plan. The plan may include the number seismic receivers-lines and the number of receivers per line per active shot. The plan may include the number and location of seismic sources. Further the plan may further include the type and activation characteristics of each seismic source, e.g. the sweep duration and spectrum of a seismic vibrator source.

The plan for a seismic survey is typically formulated based upon an expectation of the subsurface characteristics, such as the seismic velocity, target depth, attenuation and dip of seismic reflectors, and based upon the requirements for the survey such as the signal-to-noise ratio and the maximum resolution of the resulting seismic image. The plan is typically formulated based upon incomplete information about the subsurface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method for forming a seismic image of a subterranean region are disclosed. The method includes determining an initial plan for a seismic survey with a value for each member of a set of acquisition parameters and acquiring a first seismic dataset from a first portion of the seismic survey based on the initial plan. The method further includes transmitting the first seismic dataset to a seismic processor, determining a first seismic image from the first seismic dataset by performing expedited seismic processing and determining a first updated plan for the seismic survey based on the first seismic image and acquiring a second seismic dataset from a second portion of the seismic survey based on the first updated plan. The method still further includes transmitting the second seismic dataset to the seismic processor and determining the seismic based on the first seismic dataset and the second seismic dataset.

In general, in one aspect, embodiments disclosed herein relate to a non-transitory computer readable medium storing instructions executable by a computer processor. The instructions including functionality for determining an initial plan for a seismic survey over a subterranean region of interest, wherein the initial plan comprises a value for each member of a set of acquisition parameters, receiving a first seismic dataset from a first portion of the seismic survey, wherein the first seismic dataset is acquired based, at least in part, on the initial plan, and determining a first seismic image from the first seismic dataset by performing expedited seismic processing of the first seismic dataset using the seismic processor. The instructions further including functionality for determining a first updated plan for the seismic survey based on the first seismic image, receiving a second seismic dataset from a second portion of the seismic survey, wherein the second seismic dataset is acquired based, at least in part, on the first updated plan, and determining a seismic image of the subterranean region of interest based, at least in part, on the first seismic dataset and the second seismic dataset.

In general, in one aspect, embodiments disclosed herein relate to a system for forming a seismic image of a subterranean region of interest, including a seismic acquisition system, configured to acquire a first seismic datasets and a second seismic dataset, and a seismic processor. The seismic processor is configured to determine an initial plan for a seismic survey, wherein the initial plan comprises a value for each member of a set of acquisition parameters, receive from the seismic acquisition system the first seismic dataset from a first portion of the seismic survey, wherein the first seismic dataset is acquired based, at least in part, on the initial plan, and determine a first seismic image from the first seismic dataset by performing expedited seismic processing of the first seismic dataset using the seismic processor. The seismic processor is further configured to determine a first updated plan for the seismic survey based on the first seismic image, receive a second seismic dataset from the second portion of the seismic survey, wherein the second seismic dataset is acquired based, at least in part, on the first updated plan, and determine the seismic image of the subterranean region of interest based, at least in part, on the first seismic dataset and the second seismic dataset.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 2A and 2B show portions of seismic dataset in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed describe methods and systems used to evaluate the seismic data and images acquired by a seismic survey design in "real-time", i.e., during the acquisition a seismic survey. Based on evolution, seismic acquisition parameters may need to be modified while the data is still being acquired in the field. The methods and systems include the use of distributed source arrays ("DSA") to generate seismic waves and the use of fast beam migration techniques to process the resulting seismic datasets.

Figure 1:
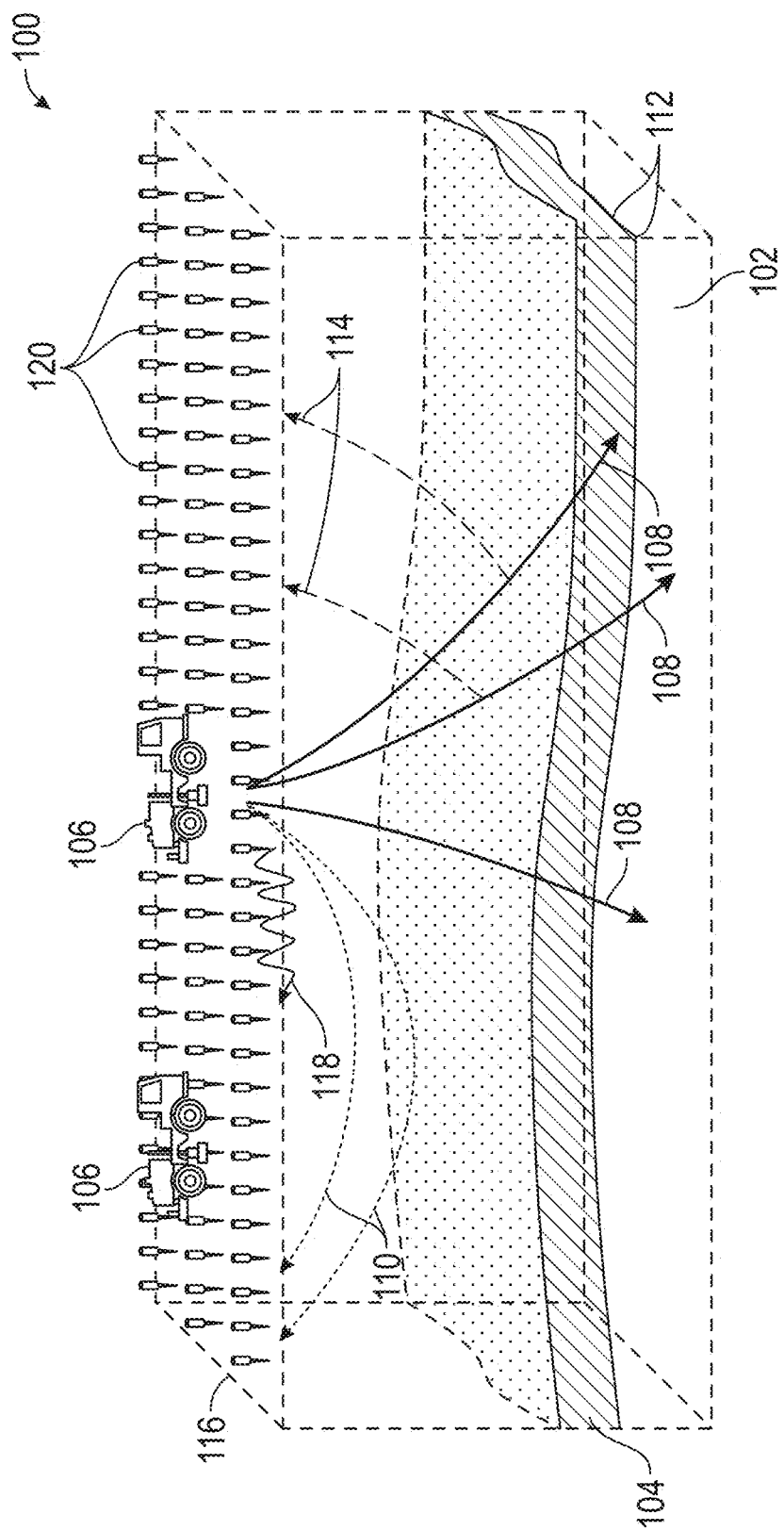
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates seismic waves (108). The type of seismic source (106) may depend on the environment in which it is used, for example on land the seismic source (106) may be a vibroseis truck or an explosive charge, but in water the seismic source (106) may be an airgun or a marine vibrator. The seismic waves (108) may return to the surface of the earth (116) as refracted seismic waves (110) or may be reflected by geological formations (112) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the surface of the earth (116) and hence are not influenced, nor contain information about, portions of the subterranean region of interest (102) where hydrocarbon reservoirs (104) are typically located. Seismic receivers (120) located on or near the surface of the earth (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The seismic receivers (120) are positioned at a plurality of seismic receiver locations which we may denote $(x_r, y_r)$ where x and y represent orthogonal axes on the surface of the earth (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (120) and t denotes the time sample at which the amplitude of ground-motion was measured.

However, a seismic survey (100) may include recordings of seismic waves generated by a seismic source (106) sequentially activated at a plurality of seismic source locations denoted $(x_s, y_s)$. In some cases, a single seismic source (106) may be activated sequentially at each source location. In other cases, a plurality of seismic sources (106) each positioned at a different location may be activated sequentially. In accordance with one or more embodiments a plurality of seismic sources (106) may be activated during the same time period, or during overlapping time periods.

A conventional seismic survey, such as a three-dimensional seismic survey acquired on land or in the ocean, is typically acquired according to a plan that has been determined prior to the beginning of the survey acquisition. For example, the plan may cover the type of equipment used, e.g., the weight of the vibroseis and the number of seismic receivers recording each activation of the vibroseis. In addition, the plan may cover the spacing of vibroseis locations ("shot points") and the locations of the seismic receivers recording each vibroseis activation ("sweep"). Further, the plan may include the length and frequency content of each sweep and the number of sweeps acquired at each shot-point. These examples provide an incomplete listing of the parameters that may be specified in the plan and are given to provide context to the invention but are not intended to limit the scope of the invention in any way.

Typically, a plan may be formed to optimize a set of survey metrics within the constraints imposed by logistical constraints. For example, a minimum level of illumination of one or more anticipated geological layers may be required. This may be expressed as a minimum value of the number ("fold") of seismic rays from the source falling within a portion ("bin") on an anticipated geological layer and recorded by a seismic receiver on the surface of the earth. The fold may be a good predictor of the signal-to-noise ("SNR") ratio of the seismic data. Similarly, the plan may be determined to ensure a minimum value for the maximum distance "offset" between the vibroseis and the furthest seismic receiver.

The plan will be constrained by logistical factors. For example, larger numbers of seismic receivers incur great cost and the maximum number of seismic receivers may be limited by the capacity of an available recording system. Similarly, parts of the surface of the Earth, such as lakes, swamps, or portions of the surface bounded by ground level pipelines, may be difficult or impossible to access by heavy vibroseis trucks. Thus, shot points may be restricted to the neighborhood of suitable roads and tracks.

The plan may be built using pre-existing information already available to the planners, such as estimates of the seismic wave propagation velocity within the subsurface region below the seismic survey, the average dip of geological layers, and amount of attenuation or absorption of seismic waves. Pre-existing information of this type may come from seismic surveys in the region conducted in previous years or decades, or small two-dimensional or three-dimensional test surveys conducted for the express purpose of in forming the plan.

Conducting a seismic survey using sequential source activations may take a significant amount of time, often several months. Furthermore, a seismic dataset acquired using sequential source activation may records tens or hundreds of terabytes ("TB") of seismic data. This seismic data must be transferred or transmitted from the location of the seismic survey to a seismic processing location that may be in a different city, country, or continent. These challenges may be mitigated using a distributed source array ("DSA"). Using a DSA may significantly reduce the time and expense involved in acquiring a seismic survey as well the size of the acquired data. For example, in a conventional sequential source activation survey, 20 TB of data may be recorded and provided to the seismic processing location, while for a DSA (i.e., blended) survey, only 5 TB may be required to cover the same area and achieve similar quality seismic images.

In some embodiments, DSA is used to improve the quality of a seismic imaging above what may be achieved with the same amount of data acquired by a conventional sequential source acquisition seismic survey. In other embodiments, DSA is used to achieve the same quality of a seismic image as that achieved by a conventional sequential source acquisition seismic survey but using a smaller volume of seismic data.

DSA acquisition includes a plurality of vibratory source groups. Each vibratory source group includes a plurality of swept-frequency seismic energy sources emitting seismic energy. A swept-frequency seismic source of energy emits energy over a duration of a sweep, for example over a duration of 30 seconds. Typically, at the beginning of the sweep, low frequencies may be emitted and, at the end of the sweep, high frequencies may be emitted with a gradual increase of frequency from the beginning to the end. The energy emitted by each vibratory source group is received as a composite ("blended") seismic record at a plurality of fixed seismic receiver arrays of seismic receivers that are deployed across a land survey area of interest. The deployment of seismic receivers may cover the length and width of the area of interest.

The vibratory source groups are positioned in different individual sectors at initial locations within the seismic receiver deployment, located away from other vibratory source groups. Frequency sweeps from each seismic energy source in the vibratory source groups are performed concurrently at assigned frequencies in different frequency bandwidths for each of the vibratory sources. The frequency sweeps for the vibratory sources in each of the individual vibratory source groups may also be conducted for different time durations from the frequency sweeps of other sources in the same vibratory source group. The seismic receivers record a blended seismic response to the subsurface formations by the frequency sweeps of the concurrently operating vibratory source groups.

FIG. 2A shows a portion of a conventional single-shot seismic survey. The vertical axis (202) indicates recording time elapsed after a seismic source (106) "firing" or excitation time. The seismic source (106) firing time may be defined to be at the beginning of the frequency sweep. The horizontal axis (204) indicates the spatial locations of each seismic receiver (120) on the surface of the earth (116). The spatial position of the seismic source (106) is indicated by the star. Each seismic receiver record runs vertically with the amplitude of the recorded seismic waves displayed using a grayscale. The first arriving seismic waves, indicated approximately by the dashed line (206), arrive earlier at seismic receivers close to the seismic source location (106) and later at seismic receivers more distanced from the seismic source location (106). Only reflected seismic waves (114) generated from radiated seismic waves (108) emitted by a single seismic source (106) are recorded during the recording time shown in the portion of the conventional single-shot seismic source survey (200).

In contrast, FIG. 2B shows a portion of a blended seismic dataset (210) acquired using a DSA seismic acquisition, in accordance with one or more embodiments. The vertical axis (212) indicates recording time elapsed after a reference time. The horizontal axis (214) indicates the spatial locations of each seismic receiver (120) on the surface of the earth (116). Each seismic receiver record runs vertically with the amplitude of the recorded seismic waves displayed using a grayscale. The seismic waves generated by a plurality of seismic sources (106) operating simultaneously may be detected and recorded by each seismic receiver (120). Thus, the amplitude detected by a seismic receiver (120) at any recording time may be the superposition of the amplitudes of a plurality of reflected seismic waves (114) emitted by a plurality of seismic sources (106). This type of data may be called "blended" seismic data.

Blended seismic data may be processed to determine a seismic velocity model and a seismic image. Conventionally, blended seismic data may be separated into estimates of components emitted by individual seismic sources (106) prior to being processed to determine a seismic velocity model and a seismic image. This process is called "deblending" and the result is called "deblended" seismic data. Deblending increases the amount of computer memory required to store the deblended seismic dataset and takes a significant duration of time to complete.

However, in accordance with one or more embodiments, the blended seismic data may be processed directly without being first transformed into deblended seismic data. Processing blended seismic data without deblending may be called "expedited processing" because the additional deblending step is omitted. Expedited processing may include fast beam tomography to determine a seismic velocity model and fast beam migration to determine one or more seismic images.

Figure 3:
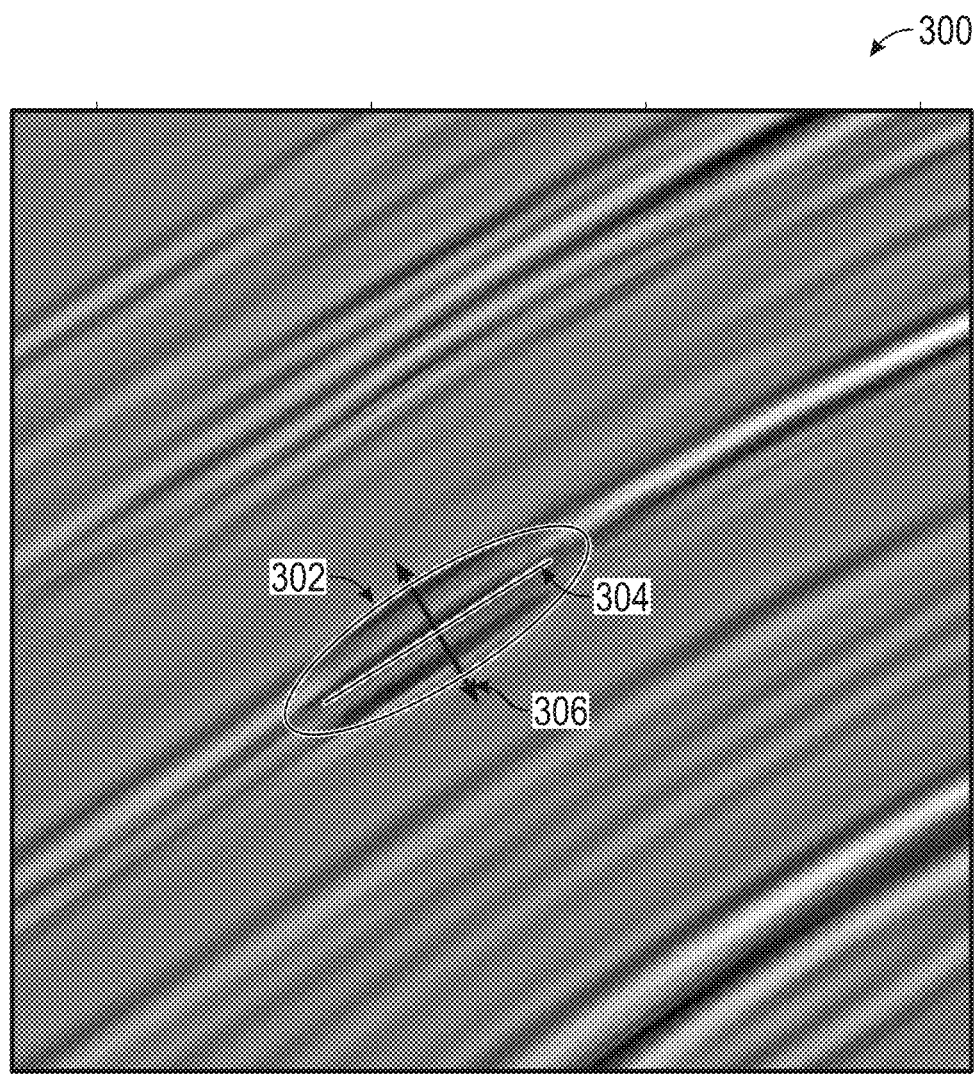
FIG. 3 shows a system in accordance with one or more embodiments.

FIG. 3 shows a portion of seismic image (300) and depicts elements of a beam (302). The elements of the beam include a wavefront (304) and a direction of translation (306). Fast beam migration (FBM) is an efficient migration algorithm that may be one or more orders of magnitude faster than the standard depth migration methods. The faster FBM permits more iterations of velocity-model building, which enables the determination of improved velocity models and much greater resolution and accuracy than standard imaging technology.

In accordance with one or more embodiments, an FBM workflow may begin with beam forming. At least a portion of the seismic input data may be analyzed for locally coherent events. The slope of these events may be identified and associated with a wavelet event. Beams may be multi-parameter objects associated with each seismic event that contain the recording time, the location of the corresponding seismic source (106) source and seismic receiver (120), the seismic wave propagation direction (306) at the seismic source (106) and the seismic receiver (120), and the associated shape ("wavelet") of the seismic wave.

The FBM workflow may further include beam propagation. In accordance with one or more embodiments, the propagation may determine the imaging point for each beam using ray tracing. For each beam, two rays are traced, one from the seismic source (106) location and one from the seismic receiver (120) location based on the seismic wave propagation direction (306) computed in the beam-forming stage. The imaging point is determined as the closest point to the source and receiver rays, satisfying the condition that the time from the seismic source (106) location to the imaging point plus the time from the imaging point to the seismic receiver (120) location equals the recording time of the event. All of the beam parameters are propagated to this point. These parameters guide the local reconstruction of the source and receiver wave fields.

In accordance with one or more embodiments, the final stage in the FBM workflow is the formation of the seismic image using the propagated parameters from the beam propagation step. This includes extrapolating the seismic wavelet locally near the imaging point. At this stage, one can produce a stacked image or several types of image gathers, including gathers binning by surface offset, surface offset and azimuth, reflection angle, reflection angle and subsurface azimuth.

Image gathers may be used to perform fast beam tomography in accordance with one or more embodiments. In the beam-propagation stage of FBM, for each beam a ray may be traced from each seismic source (106) location and each seismic receiver (120) location meet at a reflector that the beam may be imaging. If the image produced by a particular beam is not in agreement, i.e., imaged at the same depth with the images produced by other beams of this reflector, an updated or corrected seismic velocity model may be required. In accordance with one or more embodiments, for each beam, a row of a tomography matrix may be formed that contains the paths of the rays from the seismic source (106) and the seismic receiver (102). The updated seismic velocity model may be determined based, at least in part, on the inversion of the tomography matrix. Because the trajectory and the propagation time of the rays are both affected by the seismic velocity model, the correction of the seismic velocity model must be done using iterative cycles of ray tracing and inversion of the tomography matrix.

Figure 4:
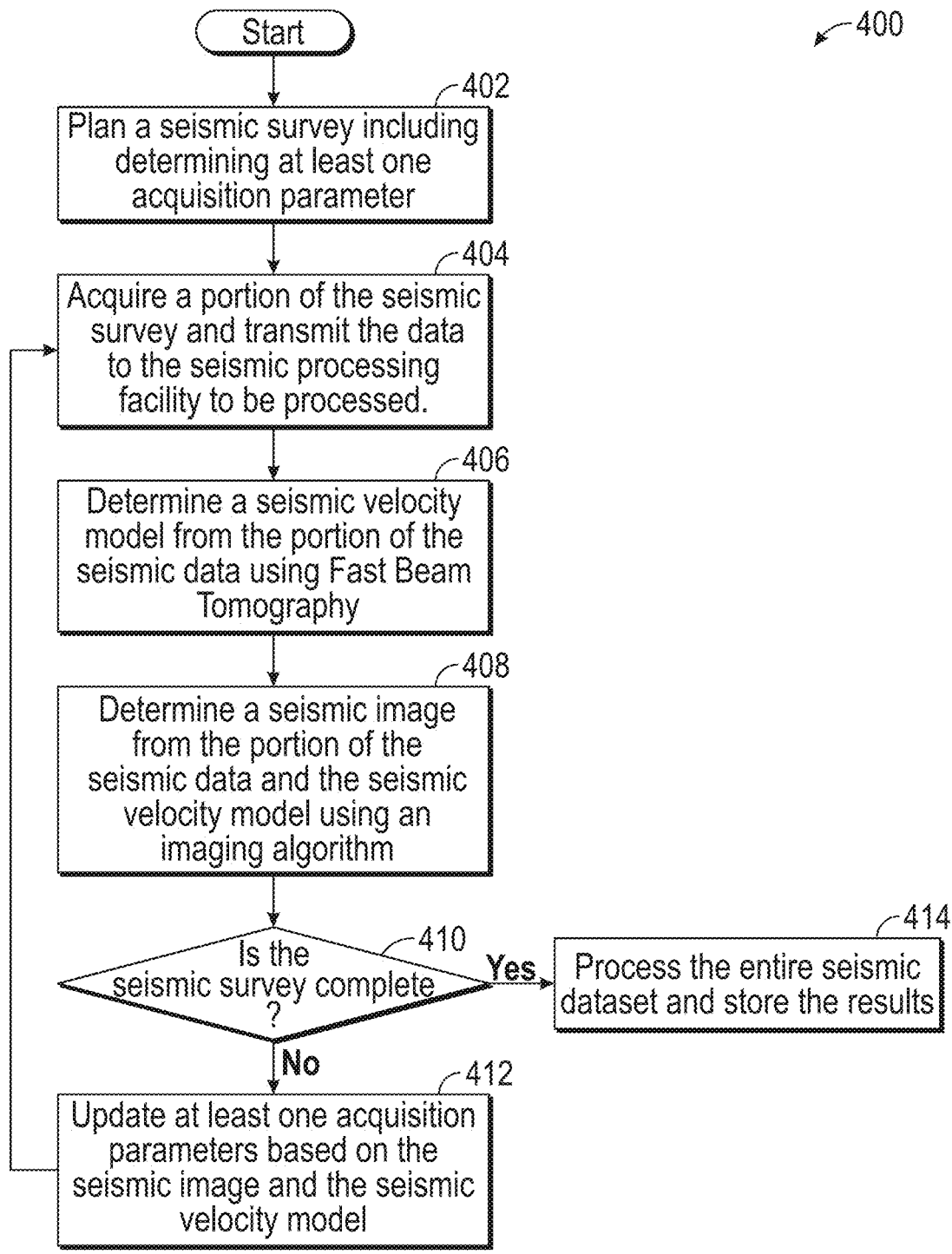
FIG. 4 shows a flowchart in accordance with one or more embodiments.

FIG. 4 depicts a flowchart (400) in accordance with one or more embodiments. In Step 402, a seismic survey may be planned. The plan may include a plurality of acquisition parameters, such as the spacing of seismic source (106) activation locations ("shot points") and the locations of the seismic receivers (120) recording each seismic source activation ("sweep"). Further, the plan may include the length and frequency content of each sweep and the number of sweeps acquired at each shot-point.

In Step 404 a portion of the seismic survey may be acquired, and the portion of the seismic dataset acquired transmitted to a seismic processing facility to be processed. The seismic survey may be acquired using a DSA. In some embodiments, the portion of the seismic dataset may be transmitted over a wireless network, including a fifth generation ("5G") wireless network. In other embodiments, the portion of the seismic dataset may be transmitted over wired network or transport on hard-drives or other computer storage.

In Step 406, in accordance with one or more embodiments, a seismic velocity model may be determined from the portion of the seismic dataset. The seismic velocity model may be determined using fast beam tomography. The fast beam tomography may be applied directly to the blended seismic dataset as an element of an "expedited" seismic processing chain.

In Step 408, a seismic image may be determined from the portion of the seismic dataset and the seismic velocity model. In accordance with one or more embodiments, the seismic image may be determined using fast beam migration. The fast beam migration may be applied directly to the blended seismic dataset as a step in an expedited seismic processing chain to produce an image in depth and horizontal position. In accordance with other embodiments, the seismic image may be determined using any other imaging technique familiar to a person of ordinary skill in the art without departing from the scope of the invention. For example, the imaging technique may be Kirchhoff migration or reverse time migration.

In Step 410, it may be determined if the entire seismic survey has been acquired, i.e., if the previously acquired portions of the seismic survey constitute the entire seismic survey. If the entire seismic survey has not been acquired the seismic survey acquisition plan may be updated, in Step 412, based upon the seismic image and the seismic velocity model determined from the previously acquired portions of the seismic survey. Updating the seismic survey acquisition plan may include updating at least one acquisition parameters based on the seismic image and the seismic velocity model. The flowchart (400) then returns to Step 404 where a further portion of the seismic survey may be acquired.

In Step 414, in accordance with one or more embodiments, the entire seismic dataset including all the portions of the seismic survey may be processed to generate a final seismic image and the results stored for later use. The processing may include a further expedited processing of the blended seismic dataset or may include deblending of the blended seismic dataset followed by a conventional seismic processing workflow, or both.

Figure 5A:
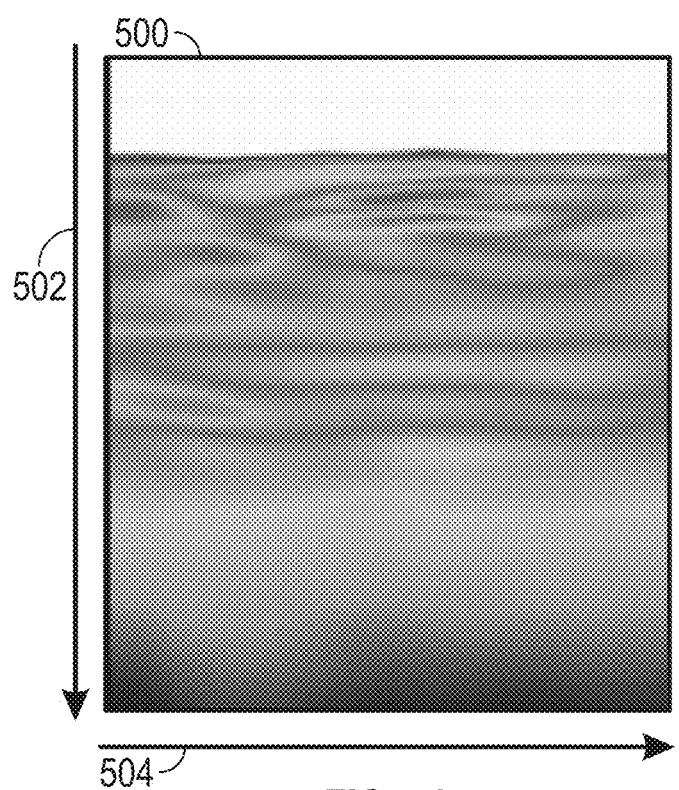
FIGS. 5A-5F shows an example application in accordance with one or more embodiments.

In accordance with one or more embodiments, FIGS. 5A-5F show results of applying the workflow depicted in flowchart (400) to a portion of a seismic dataset recorded using a DSA acquisition. FIG. 5A shows a portion of a seismic velocity model obtained with the workflow described in flowchart (400) applied to blended seismic data acquired using a DSA technique. The portion of the seismic velocity model (500) is displayed as a function of depth indicated on the vertical axis (502) and of horizontal position indicated on the horizontal axis (504). The value of seismic velocity model is indicated on a grayscale (not shown) with light shades indicating slow velocities and dark shades indicating fast velocities.

Figure 5B:
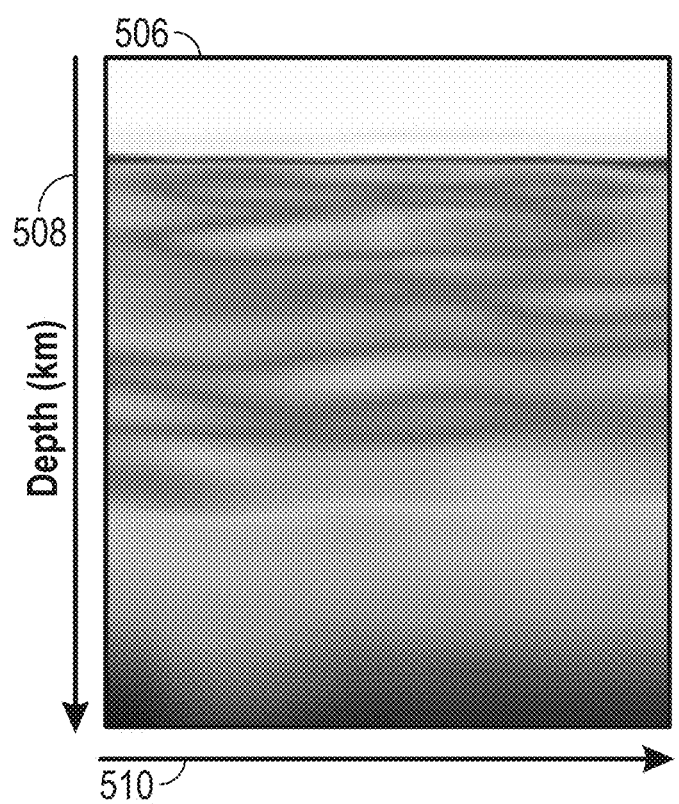

FIG. 5B also shows a portion of a seismic velocity model (506) obtained with a conventional workflow applied after deblending seismic data acquired using a DSA technique. The portion of the seismic velocity model is displayed in a manner similar to seismic velocity model (500) with depth indicated on the vertical axis (508) and of horizontal position indicated on the horizontal axis (510). A person of ordinary skill in the art will recognize the similarities between the seismic velocity model (500) and the seismic velocity model (510).

Figure 5C:
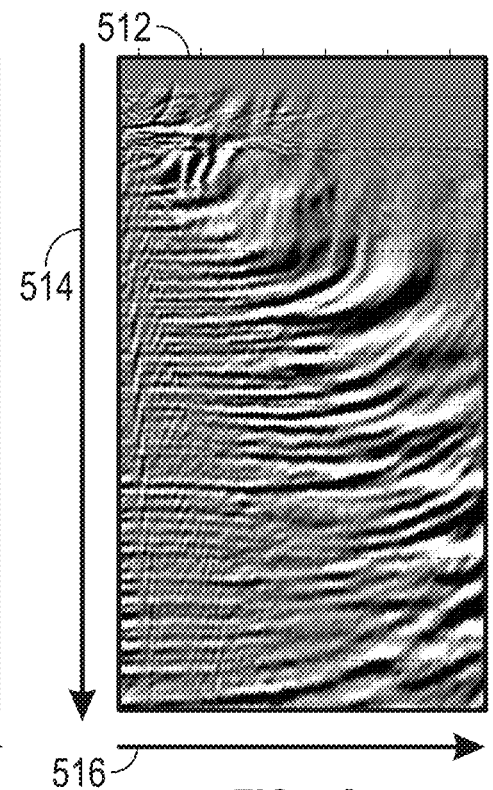

FIG. 5C shows a common image gather (512) generated using fast beam tomography and migration of the blended seismic data acquired using a DSA. The common image gather (512) is displayed with depth running vertically and indicated by vertical axis (514) and seismic source to seismic receiver separation ("offset") indicated on the horizontal axis (516). The horizontal features, particularly visible near the left-hand side of FIG. 5C, indicate a series of seismic reflectors at various depths.

Figure 5D:
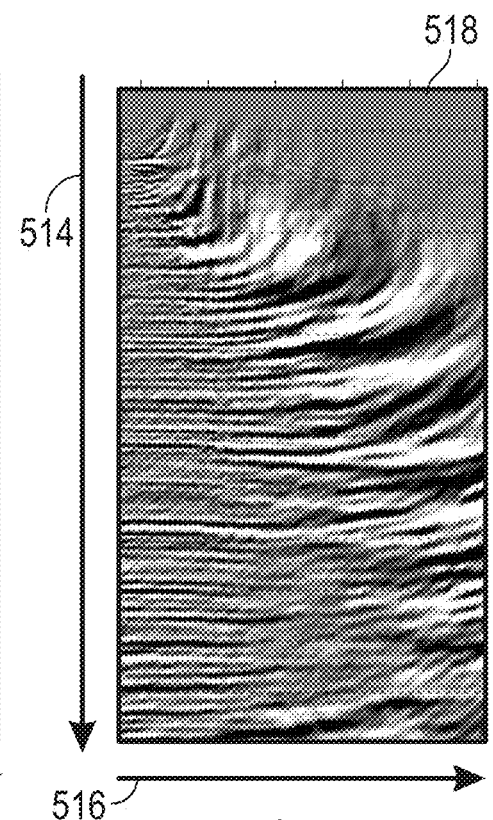

Similarly, FIG. 5D shows a common image gather (518) generated using fast beam tomography and deblended seismic data acquired using a DSA. The common image gather (518) is displayed in a manner similar to common image gather (512) and a person of ordinary skill in the art will appreciate that the horizontal features visible in common image gather (518) are of similar quality to those visible in common image gather (512).

Figure 5E:
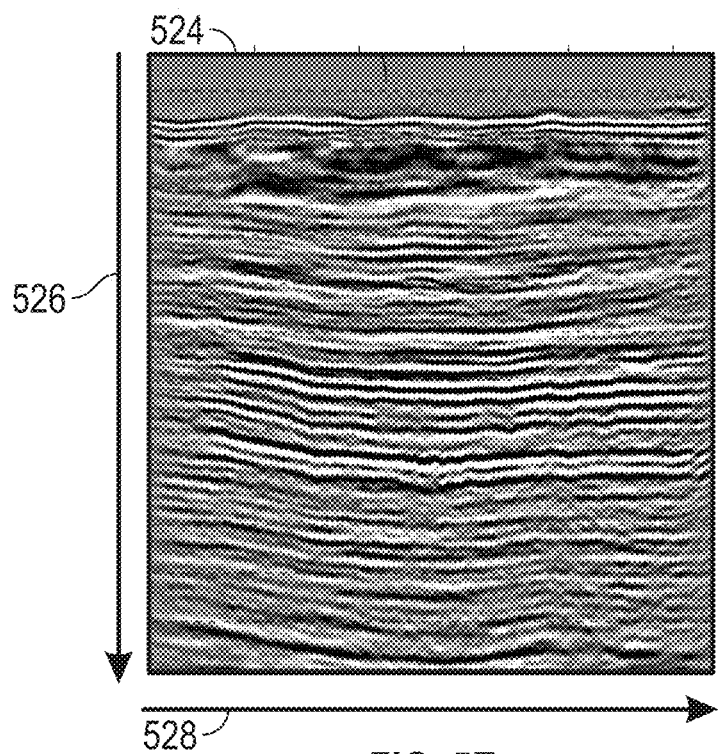
Figure 5F:
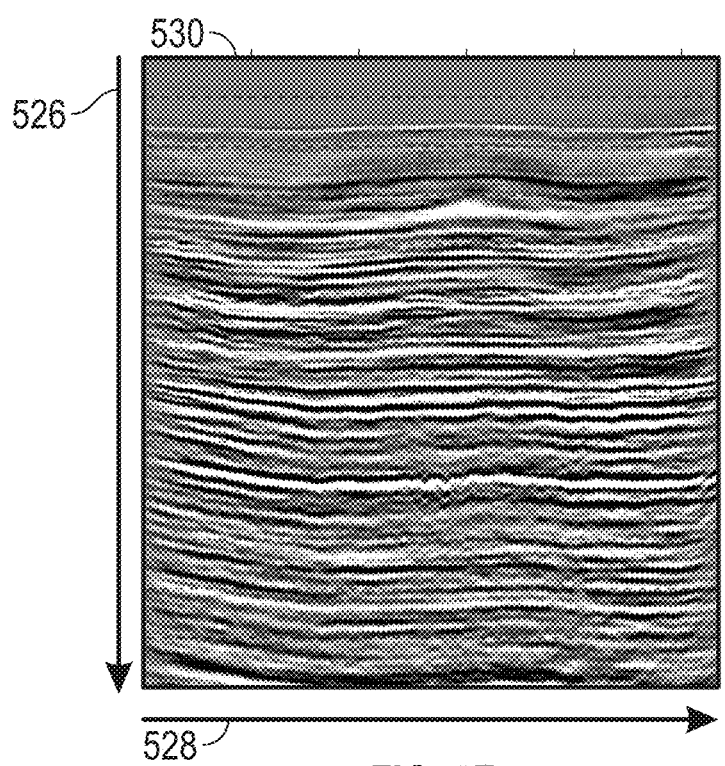

In accordance with one or more embodiments, FIG. 5E shows a portion of a seismic image (524) generated from a plurality of common image gathers, such as common image gathers (512), by summing ("stacking") over offset, i.e., stacking horizontally. Each common image gather (512) when stacked produces a single image trace forms a vertical column in seismic image (524). An adjacent image traces forms seismic image (524) display in depth, indicated on the vertical axis (526) and horizontal position on the surface of the earth (116) indicated on the horizontal axis (528). Seismic image (524) is generated directly from a blended seismic dataset acquired using a DSA without deblending.

Similarly, FIG. 5E shows a portion of a seismic image (530) generated from a plurality of common image gathers, such as common image gathers (518), by summing ("stacking") over offset, i.e., stacking horizontally. Seismic image (530) is displayed in a manner similar to seismic image (524). A person of ordinary skill in the art will readily appreciate the similarities between seismic image (530) and seismic image (524). Such a person of ordinary skill in the art will also understand the value of generating seismic image (524) in real-time during the on-going acquisition of the seismic survey (106). For example, the seismic image (524) may be generated an order of magnitude faster than the seismic image (530).

Figure 6:
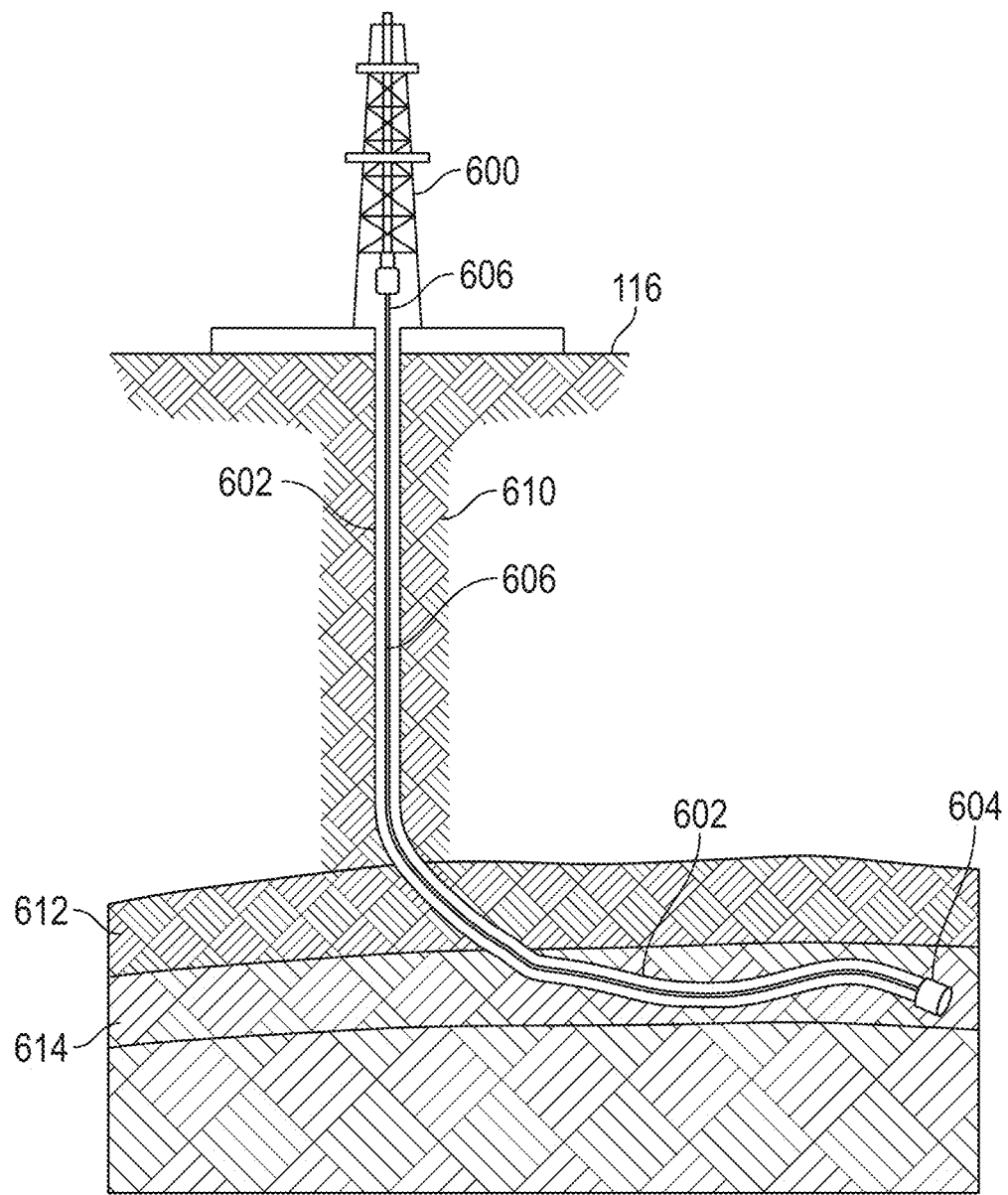
FIG. 6 shows a system in accordance with one or more embodiments.

FIG. 6 illustrates systems in accordance with one or more embodiments. As shown in FIG. 6, a wellbore (602) may be drilled by a drill bit (604) attached by a drillstring (606) to a drill rig (600) located on the surface of the earth (116). The well may traverse a plurality of overburden layers (610) and one or more cap-rock layers (612) to a hydrocarbon reservoir (614). In accordance with one or more embodiments, the final seismic image, such as the seismic image (524) as shown in FIG. 5E, may be used to plan and drill the trajectory of curved wellbore (602). The final seismic image may be generated from seismic data acquired using a DSA and whose acquisition parameters have been modified in real-time during the acquisition of the seismic survey.

Figure 7:
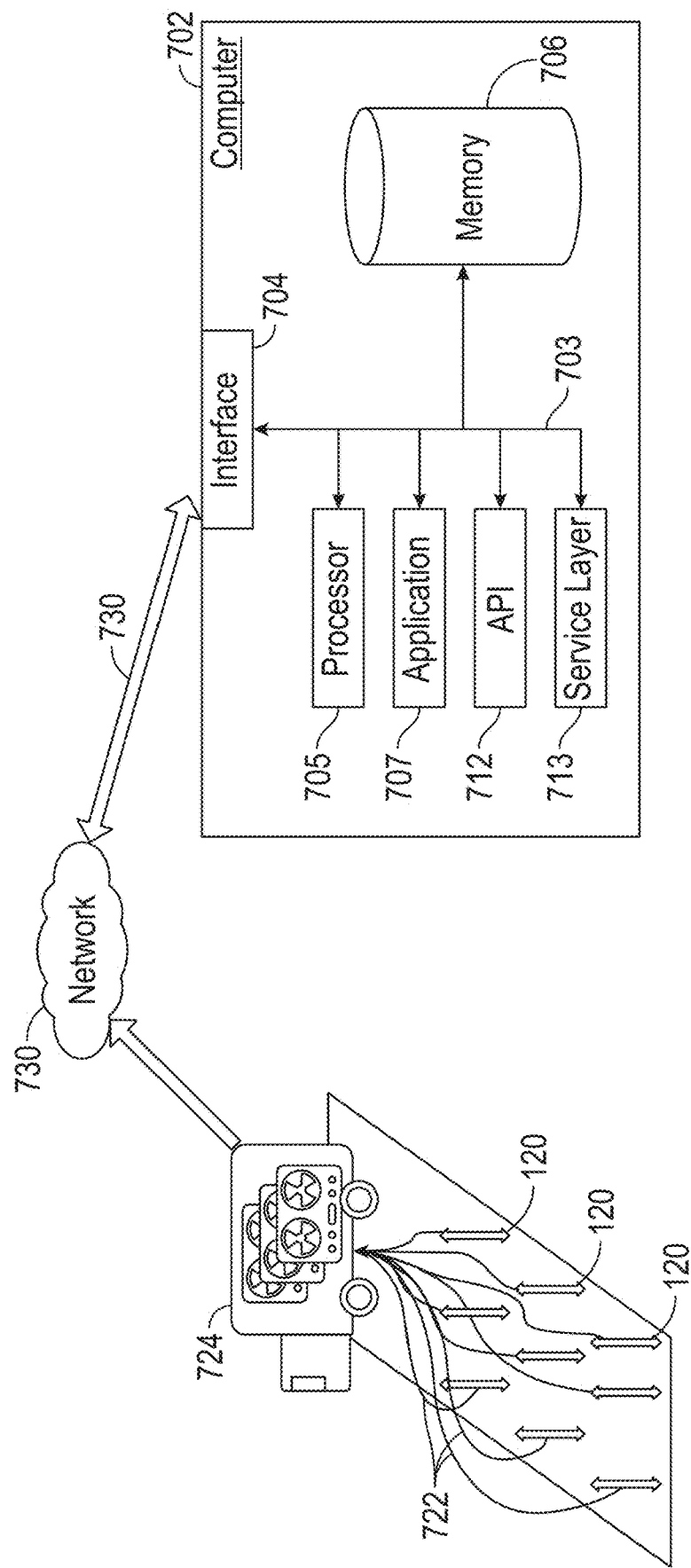
FIG. 7 shows a system in accordance with one or more embodiments.

FIG. 7 shows a seismic recording and processing system, in accordance with one or more embodiments. The data recorded by a plurality of seismic receivers (120) may be transmitted to a seismic recording facility (724) located in the neighborhood of the seismic survey (100). The seismic recording facility may be one or more seismic recording trucks. The plurality of seismic receivers (120) may be in digital or analog telecommunication with the seismic recording facility (724). The telecommunication may be performed over telemetry channels (722) that may be electrical cables, such as coaxial cables, or may be performed wireless using wireless systems, such as, radio telemetry. Digitization of the seismic data may be performed at each seismic receiver (120), or at the seismic recording facility (724), or at an intermediate telemetry node (not shown) between the seismic receiver (120) and the seismic recording facility (724).

The seismic data may be recorded at the seismic recording facility (724) and stored on non-transitory computer memory. The computer memory may be one or more computer hard-drives, or one or more computer memory tapes, or any other convenient computer memory media familiar to one skilled in the art. The seismic data may be transmitted to a computer (702) for processing. The computer (702) may be located in or near the seismic recording facility (724) or may be located at a remote location that may be in another city, country, or continent. The seismic data may be transmitted from the seismic recording facility (724) to a computer (702) for processing. The transmission may occur over a network (730) that may be a local area network using an ethernet, or alternatively the network (730) may be a wide area network using an internet or intranet service. Seismic data may be transmitted over a network (730) using satellite communication networks. The seismic data may be transmitted over a network using 5G technology and protocols.

FIG. 7 further depicts a block diagram of a computer system (702) used to provide computational functionalities associated with described algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). The memory may be a non-transitory computer readable medium. For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of forming a seismic image of a subterranean region of interest, comprising:
   determining an initial plan for a seismic survey over the subterranean region of interest, wherein the initial plan comprises a value for each member of a set of acquisition parameters;
   acquiring a first seismic dataset from a first portion of the seismic survey based, at least in part, on the initial plan;
   transmitting the first seismic dataset to a seismic processor;
   determining a first seismic image from the first seismic dataset by performing expedited seismic processing of the first seismic dataset using the seismic processor;
   determining a first updated plan for the seismic survey based on the first seismic image;
   acquiring a second seismic dataset from a second portion of the seismic survey based, at least in part, on the first updated plan;
   transmitting the second seismic dataset to the seismic processor; and
   determining the seismic image of the subterranean region of interest based, at least in part, on the first seismic dataset and the second seismic dataset,
   wherein expedited seismic processing comprises:
      determining a seismic velocity model using a fast beam tomography workflow; and
      forming the first seismic image using the seismic velocity and a fast beam migration method.

2. The method of claim 1, wherein determining the seismic image from the first seismic dataset and the second seismic dataset further comprises:
   determining a second seismic image from the second seismic dataset by performing expedited seismic processing of the second seismic dataset using the seismic processor;
   determining a second updated plan for the seismic survey based on the second seismic image;
   acquiring a third seismic dataset from a third portion of the seismic survey based, at least in part, on the second updated plan;
   transmitting the third seismic dataset to the seismic processor; and determining the seismic image by performing seismic processing of the first, second, and third seismic datasets using the seismic processor.

3. The method of claim 1, further comprising:
identifying a portion of the subterranean region of interest with a likelihood of containing hydrocarbon based, at least in part, on the seismic image of the subterranean region of interest;
determining a well path through the subterranean region of interest based, at least in part, on the identified portion of the subterranean region of interest; and
drilling the well path using a drilling system.

4. The method of claim 1, wherein acquiring the first seismic dataset comprises:
activating a plurality of seismic sources deployed as a distributed source array; and
recording seismic waves generated by the plurality of seismic sources using a plurality of seismic receivers.

5. The method of claim 1, wherein the transmitting the first seismic dataset comprises transmitting the first seismic dataset over a wireless network.

6. The method of claim 1, wherein the first seismic dataset is a blended seismic dataset.

7. A non-transitory computer readable medium storing instructions executable by a computer processor, the instructions comprising functionality for:
determining an initial plan for a seismic survey over a subterranean region of interest, wherein the initial plan comprises a value for each member of a set of acquisition parameters;
receiving a first seismic dataset from a first portion of the seismic survey, wherein the first seismic dataset is acquired based, at least in part, on the initial plan;
determining a first seismic image from the first seismic dataset by performing expedited seismic processing of the first seismic dataset using the seismic processor;
determining a first updated plan for the seismic survey based on the first seismic image;
receiving a second seismic dataset from a second portion of the seismic survey, wherein the first seismic dataset is acquired based, at least in part, on the first updated plan; and
determining a seismic image of the subterranean region of interest based, at least in part, on the first seismic dataset and the second seismic dataset,
wherein expedited seismic processing comprises:
determining a seismic velocity model using a fast beam tomography workflow; and
forming the first seismic image using the seismic velocity and a fast beam migration method.

8. The non-transitory computer readable medium of claim 7, wherein determining the seismic image comprises:
determining a second seismic image from the second seismic dataset by performing expedited seismic processing of the second seismic dataset using the seismic processor;
determining a second updated plan for the seismic survey based on the second seismic image;
receiving a third seismic dataset from a third portion of the seismic survey, wherein the third seismic dataset is acquired based, at least in part, on the second updated plan; and
determining the seismic image by performing seismic processing of the first, second, and third seismic datasets using the seismic processor.

9. The non-transitory computer readable medium of claim 7, the instructions further comprising functionality for:
identifying a portion of the subterranean region of interest with a likelihood of containing hydrocarbon based, at least in part, on the seismic image of the subterranean region of interest;
determining a well path through the subterranean region of interest based, at least in part, on the identified portion of the subterranean region of interest; and
drilling the well path using a drilling system.

10. The non-transitory computer readable medium of claim 7, wherein acquiring the first seismic dataset comprises:
activating a plurality of seismic sources deployed as a dispersed source array; and
recording seismic waves generated by the plurality of seismic sources using a plurality of seismic receivers.

11. The non-transitory computer readable medium of claim 7, wherein the receiving the first seismic dataset comprises receiving the first seismic dataset over a wireless network.

12. The non-transitory computer readable medium of claim 7, wherein the first seismic dataset is a blended seismic dataset.

13. A system for forming a seismic image of a subterranean region of interest, comprising:
a seismic acquisition system, configured to acquire a first seismic dataset and a second seismic dataset; and
a seismic processor configured to:
determine an initial plan for a seismic survey over the subterranean region of interest, wherein the initial plan comprises a value for each member of a set of acquisition parameters;
receive from the seismic acquisition system the first seismic dataset from a first portion of the seismic survey, wherein the first seismic dataset is acquired based, at least in part, on the initial plan;
determine a first seismic image from the first seismic dataset by performing expedited seismic processing of the first seismic dataset using the seismic processor;
determine a first updated plan for the seismic survey based on the first seismic image;
receive a second seismic dataset from the second portion of the seismic survey, wherein the second seismic dataset is acquired based, at least in part, on the first updated plan; and
determine the seismic image of the subterranean region of interest based, at least in part, on the first seismic dataset and the second seismic dataset,
wherein expedited seismic processing comprises:
determining a seismic velocity model using a fast beam tomography workflow; and
forming the first seismic image using the seismic velocity and a fast beam migration method.

14. The system of claim 13, wherein determining the seismic image comprises:
determining a second seismic image from the second seismic dataset by performing expedited seismic processing of the second seismic dataset using the seismic processor;
determining a second updated plan for the seismic survey based on the second seismic image;
receiving a third seismic dataset from a third portion of the seismic survey, wherein the third seismic dataset is acquired based, at least in part, on the second updated plan; and determining the seismic image by performing seismic processing of the first, second, and third seismic datasets using the seismic processor.

15. The system of claim 13, wherein the seismic processor is further configured to:
identify a portion of the subterranean region of interest with a likelihood of containing hydrocarbon based, at least in part, on the seismic image of the subterranean region of interest;
determine a well path through the subterranean region of interest based, at least in part, on the identified portion of the subterranean region of interest; and
drill the well path using a drilling system.

16. The system of claim 13, wherein acquiring the first seismic dataset comprises:
activating a plurality of seismic sources deployed as a distributed source array; and
recording seismic waves generated by the plurality of seismic sources using a plurality of seismic receivers.

17. The system of claim 13, wherein the receiving the first seismic dataset comprises receiving the first seismic dataset over a wireless network.

\* \* \* \* \*